US012663038B2

(12) United States Patent
Lang

(10) Patent No.: US 12,663,038 B2
(45) Date of Patent: Jun. 23, 2026

(54) SEALING MATERIAL, ASSEMBLY AND USE OF A SEALING MATERIAL

(71) Applicant: Henkel AG & Co. KGaA, Duesseldorf (DE)

(72) Inventor: Mathias Lang, Mannheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 883 days.

(21) Appl. No.: 17/327,857

(22) Filed: May 24, 2021

(65) Prior Publication Data

US 2021/0348641 A1     Nov. 11, 2021

Related U.S. Application Data

(63) Continuation of application No. PCT/EP2019/081439, filed on Nov. 15, 2019.

(30) Foreign Application Priority Data

Nov. 22, 2018     (DE) .................... 10 2018 219 997.3

(51) Int. Cl.
*F16B 39/22*          (2006.01)
*C09J 7/21*           (2018.01)
(Continued)

(52) U.S. Cl.
CPC .............. *F16B 39/225* (2013.01); *C09J 7/21* (2018.01); *C09J 7/255* (2018.01); *C09J 7/383* (2018.01)

(58) Field of Classification Search
CPC .... B32B 1/00; B32B 3/266; C09J 7/21; C09J 7/255; C09J 7/383; F16B 39/225
See application file for complete search history.

(56) References Cited

U.S. PATENT DOCUMENTS 3,002,770 A    10/1961   Chesnut et al.
3,470,781 A    10/1969   Steven
(Continued)

FOREIGN PATENT DOCUMENTS

CN       101454599 A    6/2009
CN       107487654 A    12/2017
(Continued)

OTHER PUBLICATIONS

Translation of KR 200389044Y1, Heo, Bong Rak, Jul. 7, 2005. (Year: 2005).*

(Continued)

*Primary Examiner* — Hai Vo
(74) *Attorney, Agent, or Firm* — Mary K. Cameron

(57)          ABSTRACT

The invention discloses an anti-twisting winding core barrel for winding of water pipe connector PTFE thread seal tape and an anti-twisting mechanism of the anti-twisting winding core barrel, and belongs to the field of building materials. The anti-twisting winding core barrel is mainly suitable for water heating device installation and comprises a winding core barrel body, the center of the winding core barrel body is provided with a central hole, and the two sides of the winding core barrel body are provided with side walls; a hollow setting-out head rotating around the winding core barrel body is arranged between the two side walls and connected to the winding core barrel body through rotary arms movably connected with the winding core barrel body; and the front end of the setting-out head is smaller than the tail end of the setting-out head, and the PTFE thread seal tape is fed from the tail end and discharged from the front end. According to the anti-twisting winding core barrel for winding of the water pipe connector PTFE thread seal tape and the anti-twisting mechanism of the anti-twisting winding core barrel, twisting of the PTFE thread seal tape during (Continued)

using is avoided, construction is convenient, wasting is avoided, meanwhile, materials are saved, and the construction period is shortened.

12 Claims, 2 Drawing Sheets

(51) Int. Cl.

| | |
|---|---|
| *C09J 7/25* | (2018.01) |
| *C09J 7/38* | (2018.01) |

(56) References Cited

U.S. PATENT DOCUMENTS

| | | | |
|---|---|---|---|
| 4,012,273 | A | 3/1977 | Inka |
| 5,569,507 | A | 10/1996 | Goodwin et al. |
| 7,905,498 | B2 | 3/2011 | Dempsey et al. |
| 2005/0084641 | A1* | 4/2005 | Downs ..................... C09J 7/10 |
| | | | 156/541 |
| 2005/0215148 | A1 | 9/2005 | Werner |

| | | | |
|---|---|---|---|
| 2009/0322040 | A1* | 12/2009 | Banba ..................... C09J 7/22 |
| | | | 277/654 |
| 2013/0233962 | A1 | 9/2013 | Wells |
| 2013/0280531 | A1 | 10/2013 | Thornton et al. |
| 2017/0313921 | A1 | 11/2017 | Bachmair et al. |

FOREIGN PATENT DOCUMENTS

| | | | |
|---|---|---|---|
| DE | 19731430 | A1 | 1/1999 |
| DE | 102011012938 | A1 | 2/2012 |
| EP | 0183090 | A1 | 6/1986 |
| EP | 1504686 | A1 | 2/2005 |
| EP | 2341113 | A2 | 7/2011 |
| EP | 3124206 | A1 | 2/2017 |
| KR | 200389044 | Y1 * | 7/2005 |
| WO | 2016065380 | A1 | 5/2016 |

OTHER PUBLICATIONS

International Search Report for International PCT Patent Application No. PCT/EP2019/081439 dated Apr. 6, 2020.

* cited by examiner

SEALING MATERIAL, ASSEMBLY AND USE OF A SEALING MATERIAL

The present invention relates to a sealing material for sealing screw passages in a torque-proof manner. The invention further relates to an assembly having at least two components interconnected by a screw connection and to the use of a sealing material for sealing a screw connection.

If two components, for example metal sheets, are interconnected by means of a screw connection, a sealing material can be used to seal the screw passage if the components are to be interconnected in a transition between a wet and a dry region, for example, so that the screw passage has to be sealed against penetrating moisture.

The problem with such seals is that a force is permanently exerted on the sealing surface, since in this case the sealing material tends to cold flow and over time flows out of the sealing surface. As a result, the seal loses its sealing function so that, for example, moisture can get into the region to be sealed via unevenness in the components. In addition, the loss of material in the sealing region reduces the clamping force applied to a screw connection and the screw connection loosens over time.

An object of the present invention is that of providing a sealing material which is suitable for permanent use in screw passages between components. Furthermore, the invention aims to provide a use for a sealing material.

This object is achieved by the subject matter of claims 1 and 11.

Advantageous embodiments and developments are found in the dependent claims, the accompanying description and the drawings.

According to one aspect of the invention, a sealing material is provided that has a first layer which is formed by a textile fabric made of synthetic fibers and has a thickness d1. Furthermore, the sealing material has a second layer which is formed by an adhesive material and has a thickness d2. The two layers of the sealing material penetrate one another when a force is applied perpendicularly to the extension of the layers, such that a sealing layer is formed having a thickness D where $0.9 \cdot d1 \leq D \leq 1.1 \cdot d1$.

Accordingly, before the screw connection is produced, the sealing material has two layers which do not completely penetrate one another. It is possible that adhesive material partially penetrates into gaps between the synthetic fibers, but the adhesive material only penetrates the textile fabric completely if a corresponding force is exerted on the sealing material during the screwing process, which force presses the adhesive material into gaps between the synthetic fibers. The material is designed such that the thickness of the layer formed under the action of force substantially corresponds to the thickness of the first layer. Accordingly, the proportion of the spaces between synthetic fibers with respect to the volume of the first layer is large enough for the majority of the adhesive material to be received therein, and the textile fabric is only slightly compressed by the action of force.

The sealing material has the advantage that the textile fabric fixes a minimum distance between the two components to be screwed together. Due to the high contact surface area, the synthetic fibers are suitable for absorbing the clamping force introduced.

The textile fabric can be warp-knitted, woven, weft-knitted, felted or composed of the synthetic fibers in some other way. The textile fabric ensures that the sealing material remains stationary as a whole, does not flow out of the space between the components and retains its sealing effect.

The formation of the textile fabric from synthetic fibers has the advantage over metal fibers that the sealing material is particularly suitable for sealing metal parts, for example metal sheets, because the synthetic material does not affect corrosion of the components.

In the delivered state, the textile fabric is not completely penetrated by the adhesive material. Since one side of the sealing material is not sticky as a result, particularly easy handling is made possible.

According to one aspect of the invention, a sealing material is accordingly provided that has a first layer which is formed by a textile fabric made of synthetic fibers, and a second layer which is formed by an adhesive material. The two layers are arranged one on top of the other and penetrate one another at most partially. By applying a force perpendicularly to the extension of the layers, however, the adhesive material can be pressed into spaces between the synthetic fibers, resulting in a single layer of which the thickness substantially corresponds to that of the first layer.

In particular, for the layer thicknesses the following can apply: $0.5 \text{ mm} \leq D, d2, d1 \leq 2 \text{ mm}$.

According to one embodiment, the synthetic fibers are in the form of polyester fibers.

As has been found, polyester is particularly suitable because polyester fibers offer sufficient resistance to an applied clamping force. As has been found, polypropylene and polyethylene fibers or textile fabrics made thereof are softer, which can lead to said fibers or fabrics not fulfilling the spacer function to a satisfactory extent. Depending on the intended use, however, textile fabrics having polypropylene and polyethylene fibers can also be suitable.

According to one embodiment, the adhesive material is in the form of an adhesive based on butyl rubber and/or epoxy resin.

Such adhesives are particularly suitable for permanently sealing screw connections in metal sheets, for example in automobile construction.

According to one embodiment, the sealing material is arranged in portions on a carrier material and each portion has at least one preformed hole that extends through the first layer and the second layer.

In this embodiment, the sealing material is pre-portioned and divided into individual portions which can each be received separately by the carrier material and used to seal a screw hole. This results in particularly good handling of the sealing material.

According to one embodiment, the sealing material is arranged in portions on a carrier material and the portions are separated from one another by free regions on the carrier material.

By providing free regions between individual portions, portions of the sealing material can be received by the carrier material particularly easily, for example also by an automatic system.

The carrier material can in particular be made of coated paper, for example wax paper, but also coated film, and facilitates the storage and handling of the sealing material.

According to one embodiment, the textile fabric has a mesh size of 0.5 mm to 2 mm. For example, the mesh size can be 1 mm. As has been found, such dimensions are suitable for allowing good penetration of the textile fabric with adhesive and also for keeping the adhesive material permanently stationary.

According to a further aspect of the invention, an assembly is provided which has at least two components interconnected by a screw connection and at least one sealing element formed of the sealing material described, the sealing element being arranged between the interconnected components around a screw hole.

The assembly has the advantage that, due to its properties already described, the sealing material can permanently absorb the clamping force exerted by the screw connections and a cold flow of sealing material out of the space between the components is prevented. The screw connection thus remains stable and sealed for a particularly long time.

The at least two components can in particular be in the form of metal sheets, for example in the form of parts of a motor vehicle.

According to a further aspect of the invention, the use of a sealing material for sealing a screw connection between two components interconnected by a screw connection is provided, the sealing material having a first layer which is formed by a textile fabric made of synthetic fibers, and a second layer which is formed by an adhesive material, the adhesive material not completely penetrating the textile fabric before the screw connection has been completed, while after the screw connection has been completed a sealing layer being formed in which meshes of the textile sheet material are substantially completely filled with the adhesive material.

The sealing material already described above is particularly suitable for this use.

Embodiments of the invention are explained in more detail below with reference to schematic drawings.

FIG. 1 schematically shows a cross section through a sealing material according to an embodiment of the invention.

FIG. 2 schematically shows a cross section through an assembly of two components interconnected by a screw connection.

Figures 1, 2:
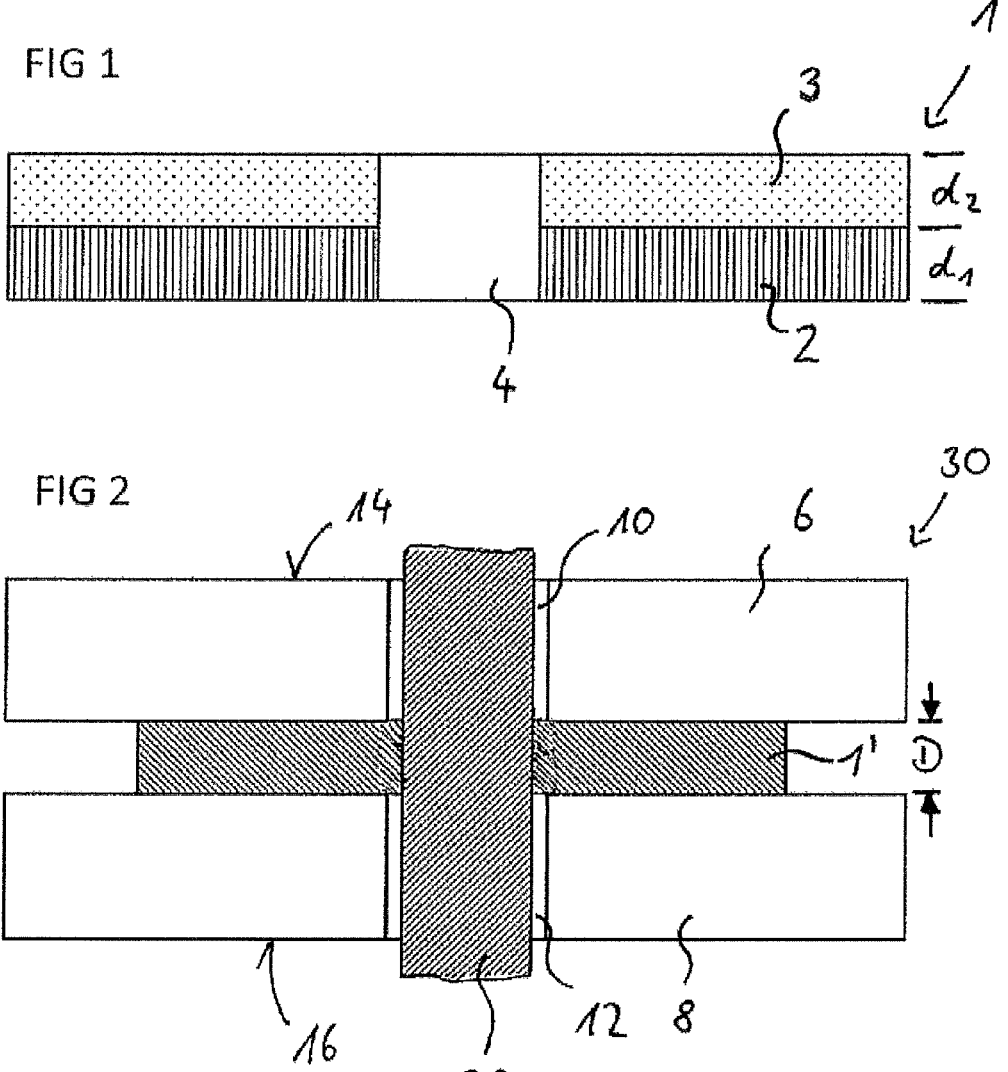

FIG. 1 schematically shows a sealing material 1 according to an embodiment of the invention. The sealing material has a first layer 2 which is formed by a textile fabric made of synthetic fibers. The first layer 2 has a thickness d1. A second layer 3, which is formed of an adhesive material and has a thickness d2, is arranged on the first layer 2. In the embodiment shown, the thicknesses d1 and d2 are approximately the same, in particular the thickness d1 is 0.5 to 0.6 mm and the thickness d2 is 0.6 to 0.7 mm. In particular, the thickness d2 can be designed to be minimally larger than the thickness d1, so that it is ensured that the spaces between synthetic fibers of the first layer 2 can be completely filled with adhesive material.

In FIG. 1, the sealing material 1 is shown in cross section. The sealing material 1 can be, for example, disk-shaped and in particular have a rectangular, square or round contour. The sealing material 1 has a hole 4 through which a screw can be passed when the sealing material 1 is used.

FIG. 1 shows the sealing material 1 in a state before its intended use. In this state, the layers 2, 3 are stacked substantially separately from one another and do not penetrate one another or only slightly penetrate one another.

FIG. 2 shows an assembly 30 composed of a first component 6 and a second component 8, the components 6, 8 being metal sheets, for example. The components 6, 8 are intended to be interconnected by means of a screw 20, which is passed through screw holes 10, 12 in the components 6, 8 and then tightened. This screw connection is intended to be sealed against penetrating moisture, for example. For example, a moist environment could be arranged adjacently to a first main surface 14 of the first component 6, while a dry environment could be arranged adjacently to a second main surface 16 of the second component 8.

In order to prevent the penetration of moisture into the screw holes 10, 12 and in particular the penetration of moisture from one side of the assembly 30 to the other side, the screw connection is sealed by means of the sealing material 1'.

In the embodiment shown in FIG. 2, the sealing material 1' has a different state than in FIG. 1. In the state shown in FIG. 2, the layers 2, 3 were already interconnected by the action of a force when the screw 20 was tightened, the adhesive material of the second layer 3 having penetrated into the spaces in the textile fabric of the first layer 2. The sealing material 1' now has a thickness D which substantially corresponds to the thickness d1 of the first layer 2.

Figure 3:
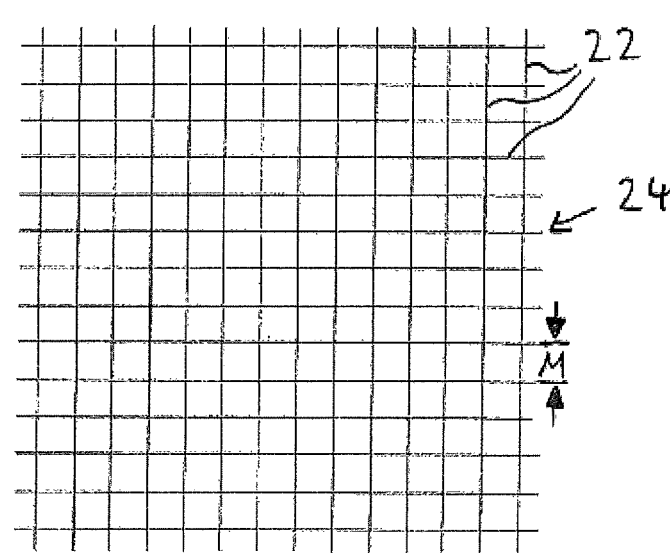
FIG. 3 is a plan view of a first layer of a sealing material according to an embodiment of the invention.

FIG. 3 is a plan view of the textile fabric 24 of the first layer 2. In the embodiment shown, the textile fabric 24 is formed of fibers 22, in particular polyester fibers, which are interwoven, the woven fabric having a mesh size M which, in the embodiment shown, is 1 mm. The spaces between individual fibers 22 are square in the embodiment shown, i.e., the fibers 22 are arranged so as to have the same spacing in both dimensions. In one embodiment, the individual polyester fibers have a diameter of 320 μm and this results in a thickness d1 of the first layer 2 of 585 μm.

Figure 4:
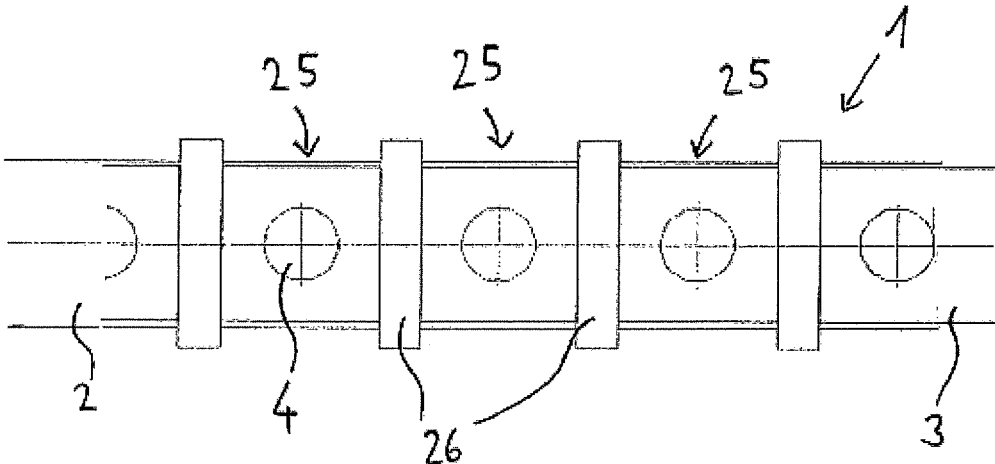
FIG. 4 is a schematic plan view of a sealing material according to an embodiment of the invention.

FIG. 4 is a plan view of a composite of individual portions 25 of sealing material 1. The sealing material 1 is arranged on a carrier material, for example coated paper, which, however, is not explicitly shown in FIG. 4. The first layer 2, which has the textile fabric, is designed to be somewhat wider in the embodiment shown than the second layer 3, which is arranged on said first layer and which has the adhesive material. The sealing material 1 is divided into individual portions 25, between each of which free regions 26 are arranged in order to be able to better receive the individual portions 25. The carrier material is exposed in the free regions 26. Each portion 25 has a hole 4 and is thus provided for sealing a screw hole.

In the embodiment shown, the portions 25 are almost square. This can be produced particularly easily and without waste. However, it is also possible to have a round contour, for example.

LIST OF REFERENCE SIGNS 1, 1' sealing material
2 first layer
3 second layer
4 hole
6 first component
8 second component
10 screw hole
12 screw hole
14 first main surface
16 second main surface
20 screw
22 fiber
24 textile fabric
25 portion
26 free region
d1 thickness
d2 thickness
D thickness
M mesh size

What is claimed is:

1. An article of manufacture for sealing a screw passage through at least two components clamped together by a screw disposed in the screw passage, the article comprising:

a) a plurality of sealing materials, each sealing material having:

a first layer having a thickness d1 and formed by a textile fabric comprising synthetic fibers, wherein the synthetic fibers are polyester fibers;

a second layer having a thickness d2 and formed by an adhesive material comprising an adhesive based on butyl rubber and/or epoxy resin, wherein the second layer is in contact with the first layer such that the textile fabric of the first layer is not completely penetrated by the adhesive material thereby providing a first side of the sealing material that is not sticky; and at least one preformed hole for a screw completely extending through the first layer and the second layer:

wherein the first and second layers are capable of penetrating one another due to a clamping force applied perpendicular to the extension of the layers by the screw such that a sealing layer is formed having a thickness D where $0.9 \cdot d1 \leq D \leq 1.1 \cdot d1$;

b) a removable carrier material disposed on a sticky second side of the sealing material, thereby facilitating storage and handling of the sealing material until said carrier material is removed to expose the sticky second side of the sealing material to one of said at least two components having the screw passage, wherein the removable carrier material is in a form of a continuous layer of a disposable paper or film, and having arranged thereon the plurality of the sealing materials wherein the sealing materials are separated from one another by free regions of the carrier material that have no sealing material.

2. The article of manufacture for sealing a screw passage according to claim 1, wherein the following applies:

$0.5 \text{ mm} \leq D \leq 2 \text{ mm}$;

$0.5 \text{ mm} \leq d2 \leq 2 \text{ mm}$; and $0.5 \text{ mm} \leq d1 \leq 2 \text{ mm}$.

3. The article of manufacture for sealing a screw passage according to claim 1, wherein the carrier material is formed of coated paper.

4. The article of manufacture for sealing a screw passage according to claim 1, wherein the textile fabric has a mesh size M of 0.5 mm to 2 mm.

5. The article of manufacture for sealing a screw passage according to claim 1, wherein the textile fabric of the first layer has a mesh size M of 0.5 mm to 2 mm, and the adhesive material of the second layer being in the form of an adhesive based on butyl rubber and epoxy resin.

6. The article of manufacture for sealing a screw passage according to claim 5, wherein the first layer of the sealing material is wider than the second layer of the sealing material.

7. The article of manufacture for sealing a screw passage according to claim 1, wherein the first layer of the sealing material is wider than the second layer of the sealing material, and the adhesive material of the second layer being in the form of an adhesive comprising butyl rubber or epoxy resin.

8. The article of manufacture according to claim 1, wherein the sealing material is disk-shaped, and has a rectangular, square or round contour.

9. The article of manufacture according to claim 1, wherein the first layer of the sealing material is wider than the second layer of the sealing material and textile fabric of the first layer in contact with the adhesive material of the second layer keeps the sealing material stationary.

10. The article of manufacture of claim 1, wherein the textile fabric fixes a minimum distance between the at least two components screwed together thereby reducing sealing material flow between said components and retaining sealing.

11. An assembly having at least two components interconnected by a screw connection, at least one sealing element comprising the article of manufacture for sealing a screw passage according to claim 1, wherein the sealing element is arranged between the interconnected components around a screw hole.

12. The assembly according to claim 11, wherein the at least two components are in the form of metal sheets.

* * * * *